Jan. 23, 1934.                 A. MARSAT                    1,944,187
                           LUMINOUS PROJECTION
                           Filed Nov. 21, 1931           2 Sheets-Sheet 1
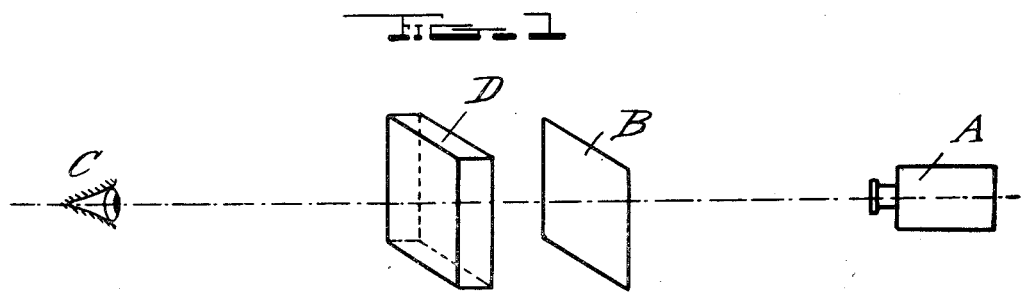
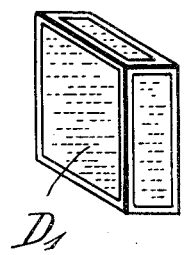
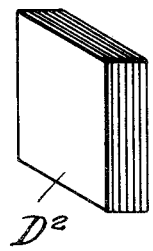
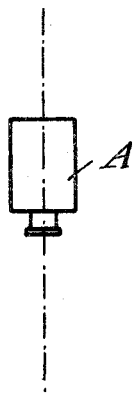
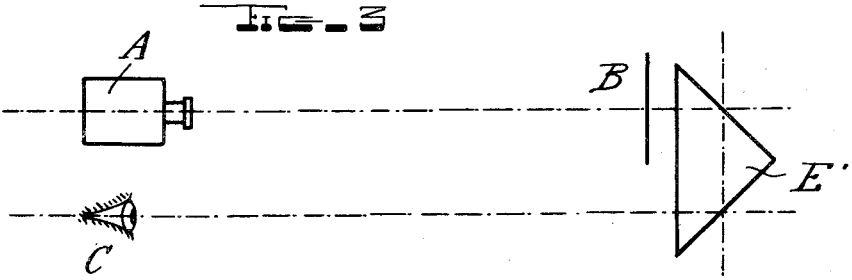
INVENTOR.
ANTOINE MARSAT
BY Doug & Cole
ATTORNEYS.

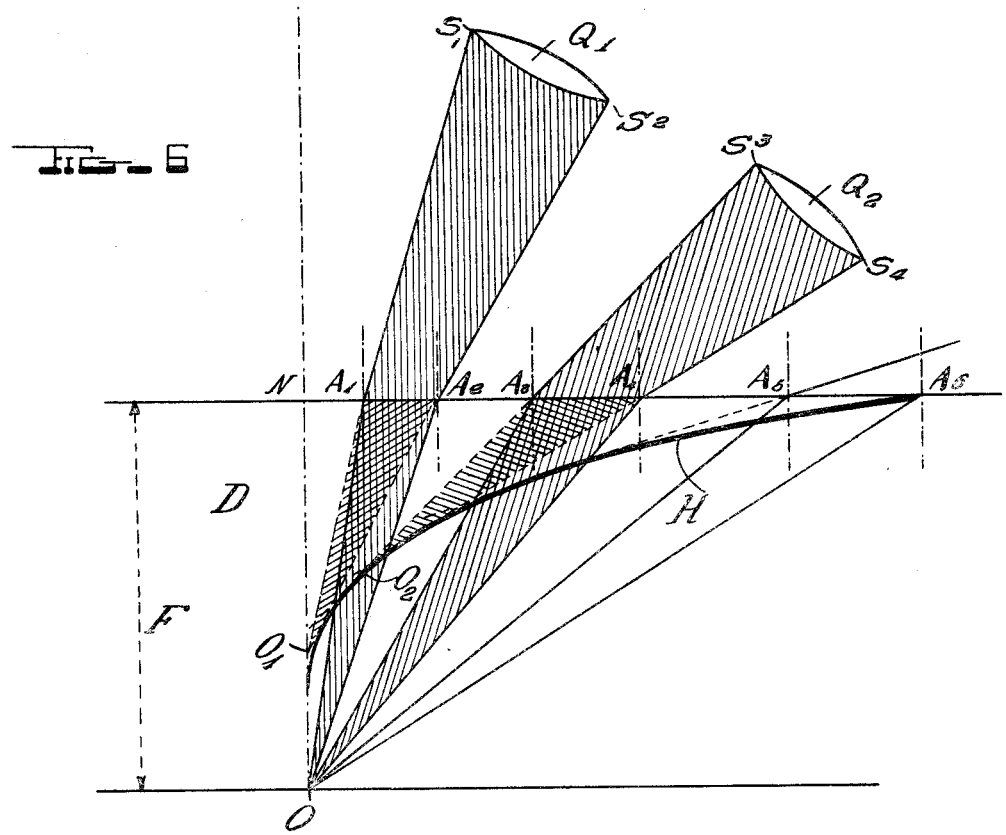
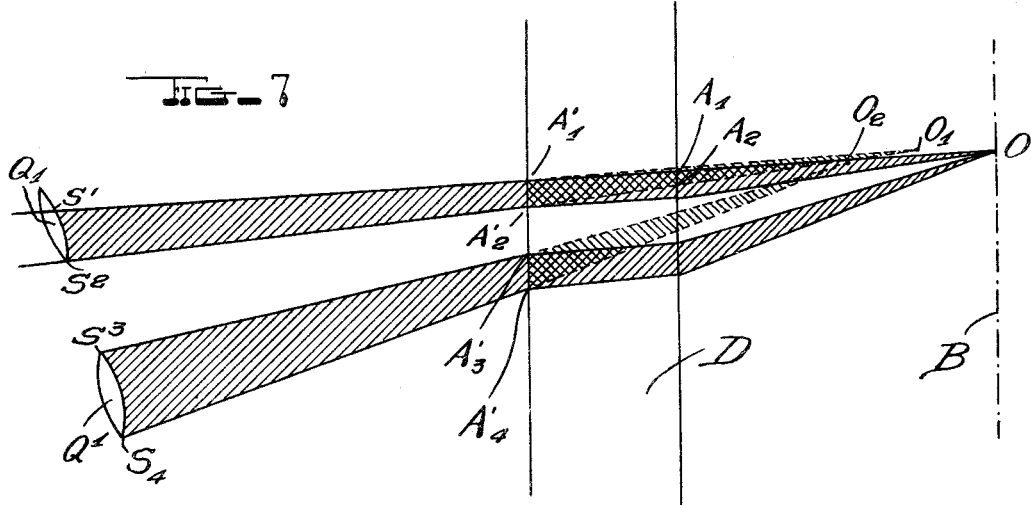

Patented Jan. 23, 1934

1,944,187

UNITED STATES PATENT OFFICE

1,944,187

LUMINOUS PROJECTION

Antoine Marsat, Verrieres Le Buisson, France, assignor to George M. Cressaty

Application November 21, 1931
Serial No. 576,565

9 Claims. (Cl. 88—24)

This invention has for its object an improvement in and relating to luminous projection, especially in cinematographic projection for the purpose of giving to the operator an impression of relief of the images or objects projected. This application is filed as a continuation in part of my application Serial No. 75,890, filed December 16, 1925.

It seems probable that ordinarily images are seen as having only two dimensions, because with a fixed or cinematographic projection the two eyes of the spectator adjust themselves in direction and distance to look on the same points and to see the two images merged into one. It has already been proposed, to obtain an impression of relief, to destroy this adjustment of the two eyes, by employing for example the caustics by refraction or by reflection given by lenses or mirrors. Lenses or mirrors, however, have the defect of distorting the image projected directly the spectator is positioned out of the line of their axis, therefore they cannot be employed for cinematographic projections in picture houses.

In accordance with the present invention and whether with cinematographic or other projection, spectators are given an impression of relief whatever may be their position, in front or at the side, with respect to the projection axis, without the production of distortion other than that which always obtains for spectators seated at the side.

According to this invention there is placed between the ordinary projection screen and the spectators a transparent body of sufficient thickness having an index of refraction clearly different from that of air, and either having faces substantially parallel or being of prismatic shape according as the luminous beam is straight or bent.

Such transparent body may be a vessel filled with suitable liquid or gas, or a single thick plate, or an assemblage of thin plates connected by any suitable binder.

As is well known, a point seen through a refracting plate gives not only a single but a caustic image, the variation becoming more pronounced as the plate is thickened. Each eye of the spectator sees a different point of this caustic and a systematic disturbance of vision results so that a spectator looking at a plane image through the plate will receive the impression that he sees the image in relief.

This likewise is true when the spectator looks at a cinematographic or other projection through the interposed refracting medium of this invention. If the refracting body, whether vessel, plate, or assemblage of plates, is sufficiently thick the spectator will receive a very clear impression of relief of the projected images and will not be annoyed by any distortion except for the distortion in a horizontal direction which is always present when the spectator is placed at the side.

The invention is illustrated diagrammatically in the accompanying drawings, in which;

Figure 1 is a diagrammatic showing of one form of the invention;

Figure 2 represents a modification in which the projected rays are bent once by a suitable prismatic body;

Figure 3 is another modification in which the rays are bent twice;

Figures 4 and 5 represent modifications of the refracting body;

Figure 6 is a diagrammatic showing of the optical effect of the refracting body shown in Figure 1 when that body contacts the projection screen; and Figure 7 is a view similar to Figure 6, with the refracting body materially spaced from the screen.

Referring more particularly to the drawings, A is a cinematographic projection apparatus of any known type, B an ordinary projection screen, and C the eye of a spectator. Between the eye C and the screen B is interposed a thick plate D having plane and parallel faces, and composed of transparent material having an index of refraction distinctly different from that of air. The plate may be of glass or any other suitable material. The height and width of plate D are determined to prevent masking of the screen B from any spectator, and to allow the screen to be observed by the spectators seated at the sides as well as in the middle of the audience.

The plate D is of such thickness that the eyes will receive a real impression of relief whatever may be the location of the eyes with respect to the axis of the projection apparatus. In this connection it may be stated that I have found after experimentation and calculation that practicable results are obtained from a plate varying in thickness from 4 to 15 centimeters which it will be observed is greatly in excess of the thickness of glass used in picture screens and also of ordinary commercial window or plate glass, and which thickness I have found will produce the results hereinafter explained in greater detail.

Furthermore, spectators positioned to the side will observe only the usual reduction of the horizontal dimensions of the projected images, due to the unavoidable foreshortening of the screen, the vertical dimensions remaining unchanged.

Screen B is preferably translucent and is formed of suitably prepared opaline or glass to give as regular a diffusion as is possible and to prevent any spectator seated in front from seeing the lens of projector A through the screen as a brilliant blot, and to prevent those seated at the sides from seeing an image only slightly illuminated.

In Figure 4 is shown a modification D' which, instead of being a solid plate, is constructed as a vessel having plane and parallel faces and filled with water or other fluid, or with gas having an index of refraction different to that of air. Figure 5 shows another modification $D^2$ which comprises a refracting body composed of a number of thin plates, as of glass, connected together by any suitable binder, as Canada balsam or the like.

In Figure 2 is shown another embodiment of the invention where a prismatic body or vessel E is used which may be of less bulk than body D. As described in connection with Figures 4 and 5, the refracting body E may be a solid prism, or may be formed of an assemblage of plates, or may be a vessel filled with suitable fluid or gas. The purpose of prism E is to bend the luminous rays once in their course from the screen to the eye of the spectator and, when used as shown in Figure 2 with the prism placed in front of the screen, it has the effect of a vessel or thick plate having parallel faces and placed before an inclined mirror.

Figure 3 shows another embodiment of the invention in which the luminous rays are bent twice. The prismatic vessel or prism E' is placed behind the screen B and is of such dimensions as to project out to one side thereof so that it is masked only partly by the screen and thus from its unmasked side sends to the eye of the spectator the luminous beam given by the projection apparatus.

Figures 6 and 7 diagrammatically indicate the manner in which the eyes of a spectator obtain the impression of relief by the use of my invention; Figure 6 showing the results obtained when plate D is placed against screen B, but does not form a part thereof and Figure 7 the results when the plate is placed some distance from the screen.

Referring first to Figure 6, D of course represents the refracting plate of a thickness F, hereinbefore stated to preferably lie within the limits of 4 to 15 centimeters. Point O is arbitrarily any point of an image projected onto screen B. Point O sends light rays (OA$_1$, OA$_2$, etc.) in all directions to pass through refracting body D; the rays on leaving the more refracting body and entering the air being bent from the normal to the surface at the point of exit according to well-known laws of refraction; the ratio of the sines of the angle of incidence and of the angle of refraction being always in inverse ratio to the indices. The rays (A$_1$S$_1$, A$_2$S$_2$) leaving the more refractive body, prolonged into this body, envelop or describe at their points of intersection a curve, called the caustic of refraction, which is tangent at the same time to the normal ON and to the surface of the refracting body at the point A$_6$ such that the ray OA$_6$ is refracted along this surface. An eye Q$_1$ which receives the luminous beam emanating from O and contained between rays OA$_1$S$_1$ and OA$_2$S$_2$ would have the impression of seeing the point O at O$_1$, the intersection of the prolongations A$_1$O$_1$ and A$_2$O$_2$ of the refracted rays A$_1$S$_1$ and A$_2$S$_2$ respectively; while another eye Q$_2$, receiving the luminous beam contained between OA$_3$S$_3$ and OA$_4$S$_4$ would on the contrary give the impression of seeing the same point O at O$_2$, the intersection of the prolongations A$_3$O$_2$ and A$_4$O$_2$ of the refracted rays A$_3$S$_3$ and A$_4$S$_4$ respectively.

Points O$_1$ and O$_2$, images of the point O for the eyes Q$_1$ and Q$_2$ of the observer, are both near or on the caustic curve H, but are separated from one another and are at different distances from the observer, and as a result these two points give to the observer an impression of seeing in relief.

In Figure 7 is shown the effect of setting the refractive body D away from the screen B. Here is attained a double refraction as shown, the reference characters being similar for similar points to Figure 6. The eyes Q$_1$ and Q$_2$ of an observer in front of the prism D from the side opposite the screen see two different images O$_1$ and O$_2$ unequally distant and corresponding to the same point O on the screen. The assemblage of these images when superposed gives the impression of relief, in the same manner that this impression is given to an observer by natural binocular vision.

It will be observed that the refractive bodies shown in Figures 1, 2, 3, 4 and 5 are all refracting bodies in the form of geometrical prisms. The term "geometrical prism" is to be accepted not in an optical sense but in a geometrical sense. Thus, as used herein, a geometrical prism is a solid body bounded by a plane polygonal base and by surfaces resting thereon and generated by the rectilinear movement along parallel paths of the lines bounding the base.

Having thus described my invention, what I claim and desire to secure by Letters Patent is:

1. In an installation for the luminous projection of images: a projection apparatus, a screen placed between the projection apparatus and the eye of the spectator, a refracting body of geometrical prismatic form, and of at least substantially 4 centimeters in thickness, said refracting body being separate from the screen, and interposed in the path of the light rays which travel from the screen to the eye of the spectator.

2. In an installation for the luminous projection of images: a projection apparatus, a screen placed between the projection apparatus and the eye of the spectator, a refracting body comprising a sheet of glass with parallel faces and of thickness between 4 and 15 centimeters, said refracting body being distinct from the screen and interposed in the path of the light rays which travel from the screen to the eye of the spectator.

3. In an installation for the luminous projection of images: a projection apparatus, a screen placed between the projection apparatus and the eye of the spectator, a refracting body comprising a relatively very thick sheet of glass with parallel faces formed by the joining together of many similar sheets of glass of commercial thickness, said refracting body being distinct from the screen and interposed in the path of the light rays which travel from the screen to the eye of the spectator.

4. In an installation for the luminous projection of images: a projection apparatus, a screen placed in front of the projection apparatus, a refracting body in the form of a triangular prism, forming a reflector by one of its faces, said refracting body being distinct from the screen and interposed in the path of the light rays which travel from the screen to an observer, and being of such thickness that said rays travel at least a distance of 4 centimeters through said refracting body.

5. In an installation for the luminous projection of images: a projection apparatus, a screen placed in front of the projection apparatus, a refracting body in the form of a triangular prism, forming a reflector by two of its faces, said refracting body being distinct from the screen and interposed in the path of the light rays which travel from the screen to an observer and being of such dimensions that said light ray travels a distance of at least 4 centimeters through said refracting body.

6. In a projection apparatus, the combination with a projector, of a translucent screen, and a hollow transparent refracting body having parallel faces, said body being separate from the screen and containing a substance having an index of refraction different from that of air and located between the eye of an observer and said screen and being of sufficient thickness to create on the eyes of the observer an impression of relief.

7. In a projecting apparatus, the combination with a projector, of a translucent screen upon which a display is adapted to be projected, a transparent refracting body having parallel plane faces, said body forming no part of the screen, and being spaced therefrom, and being interposed between the eyes of an observer and said screen, said refracting body having an index of refraction differing from that of air, and being of thickness substantially between 4 and 15 centimeters, whereby to create an impression of relief on the eyes of the observer when viewing the display on the screen through said transparent body.

8. In an installation for the luminous projection of images, a projection apparatus, a screen, a refracting body of geometrical prismatic form and of a thickness not less than 4 centimeters, such refracting body being separate from the screen and interposed in the path of the light rays which travel from the screen to the eye of the spectator.

9. In a projection apparatus the combination with a projector, of a conventional translucent screen, and a completely transparent refracting body not less than 4 centimeters in thickness and having parallel faces, located between the eyes of the observer and said screen and spaced from said screen.

ANTOINE MARSAT.